(No Model.)
J. E. HOBBS.
CONNECTING ROD FOR ATTACHABLE SLEIGH RUNNERS.
No. 593,744. Patented Nov. 16, 1897.
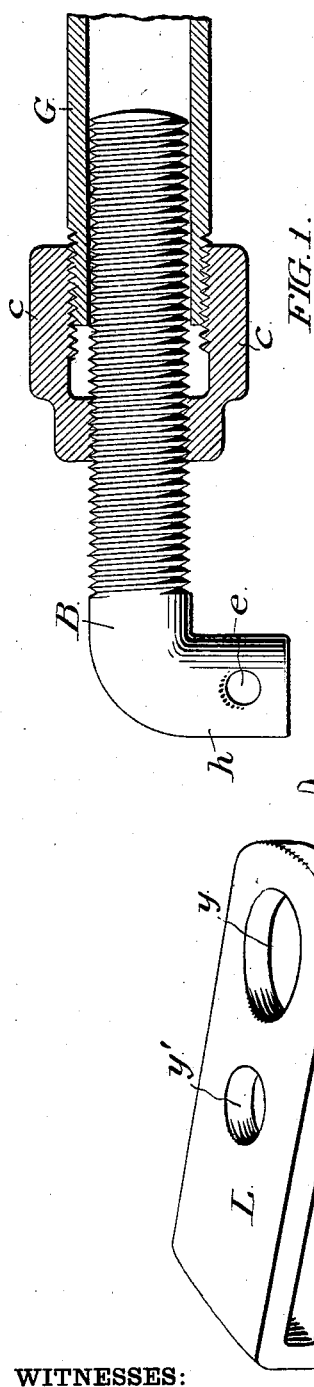
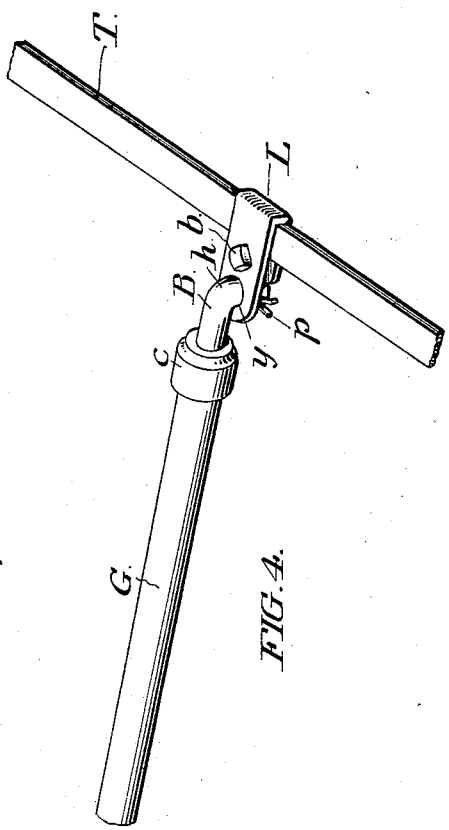
WITNESSES:
N. E. Paige
A. J. Zahm
John E. Hobbs, INVENTOR.

UNITED STATES PATENT OFFICE.

JOHN E. HOBBS, OF NORTH BERWICK, MAINE.

CONNECTING-ROD FOR ATTACHABLE SLEIGH-RUNNERS.

SPECIFICATION forming part of Letters Patent No. 593,744, dated November 16, 1897.

Application filed November 5, 1891. Serial No. 411,009. (No model.)

*To all whom it may concern:*

Be it known that I, JOHN E. HOBBS, a citizen of the United States, residing at North Berwick, in the county of York and State of Maine, have invented an Adjustable Extension Connecting-Rod for Use on Attachable Sleigh-Runners or Independent Traverse-Gear, of which the following is a specification.

The object of my invention is so to connect opposite sleigh-runners, whether attachable or working independently on pivots, as to hold them rigidly at the same distance apart, keep them in line, relieve the strain on the axles or pivots, and thereby make longer runners practicable than could be used otherwise.

In the drawings, Figure 1 represents one end of my connecting-rod with coupling and bolt, by which the adjustment of length is effected, screwed on. Fig. 2 is the split pin. Fig. 3 is the movable loop. Fig. 4 shows the movable loop clasped to the tie-bar or cap-bar of a runner, with hook of connecting-rod dropped through the eye and fastened as it would appear in use.

The rod is made of a piece of gas-pipe G of size suitable to the size and weight of the runners and about three feet six inches long, varying with the length of the axle it is used with, having at either end couplings $c$ $c$, through which are screwed bolts B B, about four inches long, with their outer ends bent at a right angle to form the hooks $h$ $h$ of, say, an inch long, the pipe, couplings, and bolts being all threaded, as shown in the drawings, the screw-threads turning in opposite directions at the two ends, so that should one turn up the other would turn off. This connecting-rod can be lengthened or shortened and set at any point desired by turning the bolts B B in or out of the couplings $c$ $c$. The hooks $h$ $h$ are pierced near the ends at $e$ $e$ to admit the split pins $p$ $p$, which prevent their jolting out of the eyes $y$ $y$.

To make the connection with the runner easy, I attach to it, at any point desired, a loop L, with the eye $y$ punched in it, through which the hook $h$ can be dropped and secured by the pin $p$. The eye $y$ can be punched in the bar of the runner or through a straight piece of metal bolted to the bar, if one pleases; but I prefer to form the loop L of a bar or piece of metal bent into a U shape, with one limb longer than the other and punched or drilled at $y$ $y'$ to receive bolts. L can be clasped around any bar or portion of a runner at will and tightened on by screwing up bolt $b$, Fig. 4, through $y'$. The hook $h$ is then dropped through $y$ and secured in place by the split pin $p$, and the couplings $c$ $c$ are screwed up to bring the rod to the length desired. The distance apart of the runners can thus be adjusted to the length of the axles of the vehicle on which they are used, and owing to the loose joint afforded by the connection of the hook $h$ and the eye $y$ have sufficient play to rock on the axles independently, but yet are kept in line and prevented from swerving from the track and straining or breaking the spindles.

What I claim as my invention, and desire to secure by Letters Patent, is—

An adjustable extension connecting-rod for holding a pair of sleigh-runners parallel with each other, consisting of a rod having each of its ends tubular to receive the shank of a bolt, the circumference of each end of said rod threaded for a distance and in opposite directions and having fitted thereon threaded couplings, the interior of the outer ends of said couplings reduced in diameter and threaded, said bolts each having a hook formed thereon, and the shank of each of said bolts threaded and fitted in the reduced ends of said couplings and the free ends of said hooks provided with apertures to receive a key to hold said hooks in place when engaged in eyes or apertures, substantially as shown and described.

JOHN E. HOBBS.

Witnesses:
CHAS. W. GREENLEAF,
CHAS. F. GOODWIN.